(12) United States Patent (10) Patent No.: US 8,874,447 B2
Da Palma et al. (45) Date of Patent: *Oct. 28, 2014

(54) INFERRING SWITCHING CONDITIONS FOR SWITCHING BETWEEN MODALITIES IN A SPEECH APPLICATION ENVIRONMENT EXTENDED FOR INTERACTIVE TEXT EXCHANGES

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,198

(22) Filed: Jul. 6, 2012

(65) Prior Publication Data

US 2012/0271643 A1 Oct. 25, 2012

Related U.S. Application Data

(63) Continuation of application No. 13/179,098, filed on Jul. 8, 2011, now Pat. No. 8,239,204, which is a continuation of application No. 11/613,176, filed on Dec. 19, 2006, now Pat. No. 8,000,969.

(51) Int. Cl.
*G10L 21/00* (2013.01)
*G10L 25/00* (2013.01)
*G10L 15/22* (2006.01)

(52) U.S. Cl.
CPC .................................. *G10L 15/22* (2013.01)
USPC ................. 704/270.1; 704/270; 704/275

(58) Field of Classification Search
USPC .................................... 704/270–275
See application file for complete search history.

(56) References Cited

U.S. PATENT DOCUMENTS 5,745,904 A 4/1998 King et al.
5,953,392 A * 9/1999 Rhie et al. .................. 379/88.13
(Continued)

FOREIGN PATENT DOCUMENTS

FR 2844127 3/2004

OTHER PUBLICATIONS

"Jabberwacky—About Thoughts—An Artificial Intelligence. AI chatbot, chatterbot or chatterbox", 1997-2006 Rollo Carpenter.

(Continued)

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

The disclosed solution includes a method for dynamically switching modalities based upon inferred conditions in a dialog session involving a speech application. The method establishes a dialog session between a user and the speech application. During the dialog session, the user interacts using an original modality and a second modality. The speech application interacts using a speech modality only. A set of conditions indicative of interaction problems using the original modality can be inferred. Responsive to the inferring step, the original modality can be changed to the second modality. A modality transition to the second modality can be transparent the speech application and can occur without interrupting the dialog session. The original modality and the second modality can be different modalities; one including a text exchange modality and another including a speech modality.

17 Claims, 3 Drawing Sheets

(56) References Cited

U.S. PATENT DOCUMENTS

| | | | |
|---|---|---|---|
| 6,012,030 A | 1/2000 | French-St. George et al. | |
| 6,366,651 B1* | 4/2002 | Griffith et al. | 379/88.14 |
| 6,504,910 B1 | 1/2003 | Engelke et al. | |
| 6,735,287 B2 | 5/2004 | Vishik et al. | |
| 6,801,604 B2* | 10/2004 | Maes et al. | 379/88.17 |
| 6,816,578 B1 | 11/2004 | Kredo et al. | |
| 6,839,896 B2* | 1/2005 | Coffman et al. | 719/310 |
| 6,895,084 B1 | 5/2005 | Saylor et al. | |
| 6,934,756 B2* | 8/2005 | Maes | 709/227 |
| 6,964,023 B2* | 11/2005 | Maes et al. | 715/811 |
| 6,996,800 B2* | 2/2006 | Lucassen et al. | 717/106 |
| 7,065,185 B1 | 6/2006 | Koch | |
| 7,069,014 B1* | 6/2006 | Thenthiruperai et al. | 455/452.2 |
| 7,136,909 B2 | 11/2006 | Balasuriya | |
| 7,366,285 B2* | 4/2008 | Parolkar et al. | 379/88.17 |
| 7,548,858 B2* | 6/2009 | Wang | 704/260 |
| 7,921,214 B2 | 4/2011 | Da Palma et al. | |
| 8,000,969 B2 | 8/2011 | Da Palma et al. | |
| 8,204,182 B2 | 6/2012 | Da Palma et al. | |
| 8,239,204 B2 | 8/2012 | Da Palma et al. | |
| 2001/0049603 A1 | 12/2001 | Sravanapudi et al. | |
| 2002/0052747 A1* | 5/2002 | Sarukkai | 704/270 |
| 2002/0144233 A1 | 10/2002 | Chong et al. | |
| 2003/0046316 A1 | 3/2003 | Gergic et al. | |
| 2003/0097262 A1* | 5/2003 | Nelson | 704/235 |
| 2003/0110297 A1* | 6/2003 | Tabatabai et al. | 709/246 |
| 2003/0115289 A1* | 6/2003 | Chinn et al. | 709/219 |
| 2003/0125958 A1 | 7/2003 | Alpdemir et al. | |
| 2003/0126330 A1 | 7/2003 | Balasuriya | |
| 2003/0171926 A1* | 9/2003 | Suresh et al. | 704/270.1 |
| 2003/0187660 A1 | 10/2003 | Gong | |
| 2003/0225825 A1* | 12/2003 | Healey et al. | 709/203 |
| 2004/0054740 A1 | 3/2004 | Daigle et al. | |
| 2004/0073431 A1 | 4/2004 | Galanes et al. | |
| 2004/0104938 A1 | 6/2004 | Saraswat et al. | |
| 2004/0109541 A1 | 6/2004 | Celi et al. | |
| 2004/0166832 A1* | 8/2004 | Portman et al. | 455/412.1 |
| 2004/0189791 A1 | 9/2004 | Haruki | |
| 2004/0230689 A1* | 11/2004 | Loveland | 709/229 |
| 2005/0021826 A1* | 1/2005 | Kumar | 709/232 |
| 2005/0027538 A1 | 2/2005 | Halonen et al. | |
| 2005/0027839 A1 | 2/2005 | Day et al. | |
| 2005/0048992 A1* | 3/2005 | Wu et al. | 455/466 |
| 2005/0132323 A1* | 6/2005 | Huerta et al. | 717/100 |
| 2005/0135383 A1* | 6/2005 | Shenefiel | 370/395.52 |
| 2005/0137875 A1 | 6/2005 | Kim et al. | |
| 2005/0165599 A1* | 7/2005 | Russell et al. | 704/7 |
| 2005/0171664 A1 | 8/2005 | Konig | |
| 2006/0093998 A1 | 5/2006 | Vertegaal | |
| 2006/0173689 A1 | 8/2006 | Hataoka et al. | |
| 2007/0005366 A1 | 1/2007 | Sravanapudi et al. | |
| 2007/0135101 A1 | 6/2007 | Ramati et al. | |
| 2008/0059152 A1 | 3/2008 | Fridman et al. | |
| 2008/0147406 A1 | 6/2008 | Da Palma et al. | |
| 2009/0013035 A1 | 1/2009 | Hosn et al. | |
| 2011/0161890 A1* | 6/2011 | Anderson et al. | 715/863 |

OTHER PUBLICATIONS

"TodayTranslations, Breaking the Web Barrier", Surfocracy, 2006.

Olsson, D., et al., "MEP—A Media Event Platform", Mobile Networks and Applications, Kluwer Academic Publishers, vol. 7, No. 3, pp. 235-244, 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Waibel, A.; Suhm, B.; Minh Tue Vo; Jie Yang. Multimodal interfaces for multimedia information agents Acoustics, Speech, and Signal Processing, 1997. ICASSP-97., 1997 IEEE International Conference on (0-8186-7919-0) 1997. Vol.1; p. 170 vol. 1-170 vol. 1.

\* cited by examiner

INFERRING SWITCHING CONDITIONS FOR SWITCHING BETWEEN MODALITIES IN A SPEECH APPLICATION ENVIRONMENT EXTENDED FOR INTERACTIVE TEXT EXCHANGES

RELATED APPLICATIONS

This is a continuation of U.S. application Ser. No. 13/179,098, entitled "INFERRING SWITCHING CONDITIONS FOR SWITCHING BETWEEN MODALITIES IN A SPEECH APPLICATION ENVIRONMENT EXTENDED FOR INTERACTIVE TEXT EXCHANGES," filed on Jul. 8, 2011, and now pending, which is a continuation of U.S. application Ser. No. 11/613,176, entitled "INFERRING SWITCHING CONDITIONS FOR SWITCHING BETWEEN MODALITIES IN A SPEECH APPLICATION ENVIRONMENT EXTENDED FOR INTERACTIVE TEXT EXCHANGES," filed on Dec. 19, 2006, now U.S. Pat. No. 8,000,969. Each of the foregoing documents is incorporated herein by reference in its entirety.

BACKGROUND

1. Field of the Invention

The present invention relates to the field of automated speech systems and, more particularly, to inferring switching conditions for switching between modalities in a speech application environment extended for text-based interactive services.

2. Description of the Related Art

Interactive Voice Response (IVR) systems are often used to provide automated customer service via a voice channel of a communication network. IVR systems permit routine customer requests to be quickly, efficiently, and automatically handled. When a request is non-routine or when a caller has difficulty with the IVR system, a transfer can be made from the IVR system to a customer service representative. Even when human interactions are needed, the IVR system can obtain necessary preliminary information, such as an account number and a reason for a call, which can ensure callers are routed to an appropriate human agent and to ensure human-to-human interactive time is minimized. Successful use of IVR systems allows call centers to be minimally manned while customers are provided a high level of service with relatively low periods spent in waiting queues.

IVR systems, especially robust ones having natural language understanding (NLU) capabilities and/or large context free grammars, represent a huge financial and technological investment. This investment includes costs for purchasing and maintaining IVR infrastructure hardware, IVR infrastructure software, and voice applications executing upon this infrastructure. An additional and significant reoccurring cost can relate to maintaining a sufficient number of voice quality channels to handle anticipated call volume. Further, each of these channels consumes an available port of a voice server, which has a limited number of costly ports. Each channel also consumes a quantity of bandwidth needed for establishing a voice quality channel between a caller and the IVR system.

One innovative solution for extending an IVR infrastructure to permit text-based interactive services is detailed in co-pending patent application Ser. No. 11/612,996 entitled "Using an Automated Speech Application Environment to Automatically Provide Text-Based Interactive Services." More specifically, the co-pending application teaches that a chat robot object, referred to as a Chatbot, can dynamically convert text received from a text-messaging client to input consumable by a voice server and can dynamically convert output from the voice server to text appropriately formatted for the client. From a perspective of the voice server, the text-based interactions with the text-messaging client are handled in the same manner and with the same hardware/software that is used to handle voice-based interactions. The enhanced speech application environment allows for a possibility of switching between modalities, without interrupting a pre-existing communication session, which is elaborated upon in co-pending patent application Ser. No. 11/613,040 entitled "Switching Between Modalities in a Speech Application Environment Extended for Text-Based Interactive Services."

Different advantages exist for a text-messaging modality and for a voice modality. In a text modality, for example, a user may have difficulty entering lengthy responses. This is particularly true when a user has poor typing skills or is using a cumbersome keypad of a resource constrained device (e.g., a Smartphone) to enter text. In a voice modality, a speech recognition engine may have difficulty understanding a speaker with a heavy accent, or who speaks with an obscure dialect. A speech recognition engine can also have difficulty understanding speech transmitted over a low quality voice channel. Further, speech recognition engines can have low accuracy when speech recognizing proper nouns, such as names and street addresses. In all of these situations, difficulties may be easily overcome by switching from a voice modality to a text messaging modality. No known system has an ability to switch between voice and text modalities during a communication session. Teachings regarding inferential modality switching are non-existent.

SUMMARY OF THE INVENTION

The present invention teaches a solution applicable to a communication system having multiple interactive modalities that permits users to dynamically switch modalities during a communication session. For example, a user can dynamically switch between a text-messaging modality and a voice modality while engaged in a communication session with an automated response system, such as an IVR. The invention can infer a need to switch modalities based upon conditions of a communication session. When this need is inferred, a programmatic action associated with modality shifting can occur.

For instance, a user can be prompted to switch modalities, a modality switch can automatically occur, or a new modality can be automatically added to the communication session, which results in a multi mode communication session or a dual mode communication session. In a multi mode communication session more than one input/output modality (e.g., speech and text) can be permitted for a single device/client application communicating over a single communication channel. In a dual mode communication session, different devices (e.g., a phone and a computer) each associated with a different modality and/or communication channel can be used during an interactive communication session. That is, a user can respond to a session prompt by speaking a response into a phone or by typing a response into a text-messaging client, either of which produces an equivalent result.

It should be appreciated that conventional solutions for providing voice and text-messaging services implement each service in a separate and distinct server. Each of these servers would include server specific applications tailored for a particular modality. For example, a VoiceXML based application controlling voice-based interactions can execute on a speech server and a different XML based application controlling text-based interactions can execute on a text-messaging server.

Any attempt to shift from a text session to a voice session or vice-versa would require two distinct servers, applications, and communication sessions to be synchronized with each other. For example, if a voice session were to be switched to a text session, a new text session would have to be initiated between a user and a text-messaging server. The text-messaging server would have to initiate an instance of a text-messaging application for the session. Then, state information concerning the voice session would have to be relayed to the text-messaging server and/or the text-messaging application. Finally, the speech application executing in the speech server would need to be exited and the original voice session between the speech server and a user terminated.

These difficulties in switching modalities during a communication session are overcome by using a novel speech application environment that is extended for text-based interactive services. This speech application environment can include a Chatbot server, which manages chat robot objects or Chatbots. Chatbots can dynamically convert text received from a text-messaging client to input consumable by a voice server and to generate appropriately formatted for the client. For example, the Chatbot server can direct text messaging output to a text input API of the voice server, which permits the text to be processed. Additionally, voice markup output can be converted into a corresponding text message by the Chatbot server. The extended environment can use unmodified, off-the-shelf text messaging software and can utilize an unmodified speech applications. Further, the present solution does not require special devices, protocols, or other types of communication artifacts to be utilized.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
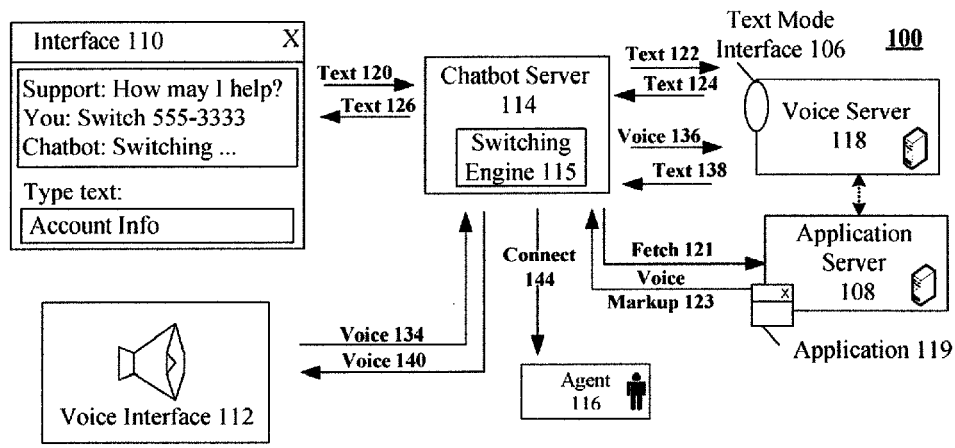
FIG. 1 is a schematic diagram of a system for a Chatbot server that permits smooth user switching between text and voice modalities based upon inferred conditions without interrupting an existing communication session.
Figure 1:
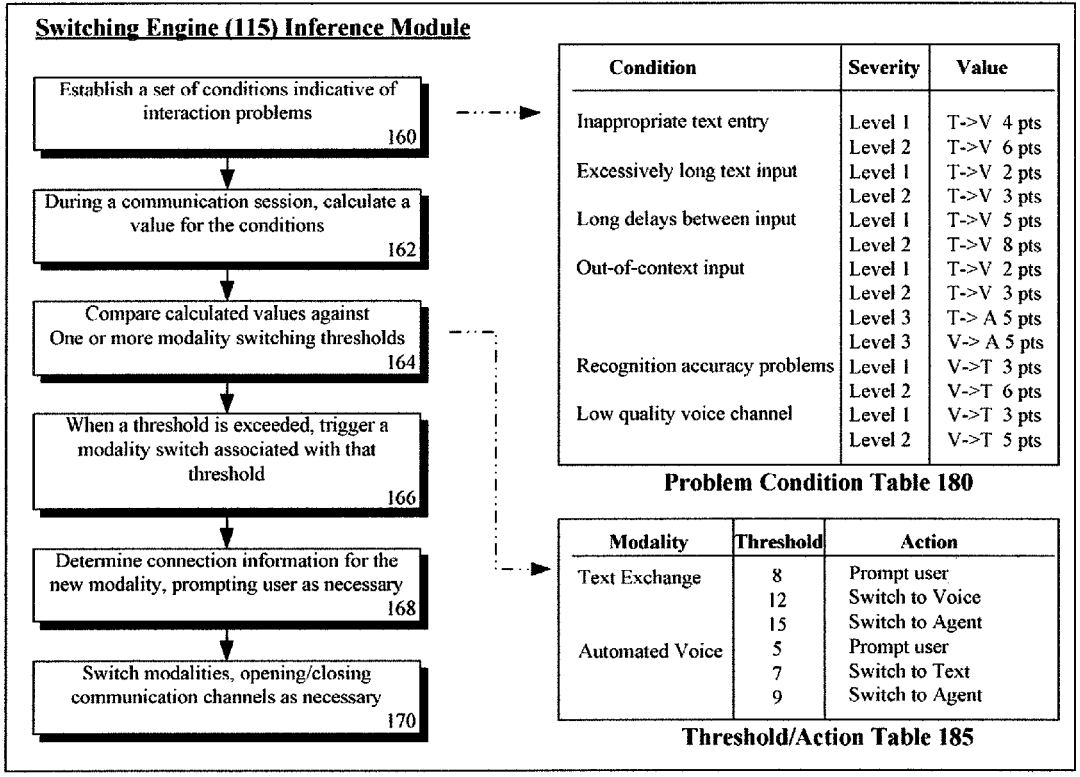

FIG. 1 is a schematic diagram of a system 100 for a Chatbot server 114 that permits smooth user switching between text and voice modalities based upon inferred conditions without interrupting an existing communication session. The speech-enabled application 119 can be a VoiceXML application, such as an application for an Interactive Voice Response System (IVR) often deployed at contact centers. The text exchange client interface 110 can be an interface for any type of text exchange communications, such as Instant Message (IM) communications, chat communications, text-messaging using SAMETIME, TRILLIAN, YAHOO! MESSENGER, and the like. The voice interface 112 can be any interface over which real time speech communications occur. For example, interface 112 can include, but is not limited to, a telephone input/output (I/O) interface, a mobile communication device (e.g., cell phone) I/O interface, a two way radio I/O interface, and/or a Voice over Internet Protocol (VOIP) interface.

The voice server 118, like most voice servers, can include a text mode interface 106, which is typically used by developers, system maintainers, and/or trainers of a speech recognition engine. For example, a set of proprietary, restricted, or standardized (e.g., MRCPv2 INTERPRET) Application Program Interfaces (APIs) can be used for the interface 106. This set of APIs, which are typically not available or accessible within a production environment, can be enabled to create a text input channel that consumes considerably fewer computing resources that a voice channel, which is typically established with the voice server 118 operating in a production environment. In most cases, the text mode interface 106 is present, but dormant, within production voice servers 118. Interface 106 can be enabled for text based interactions with Chatbot server.

Use of interface 106 occurs in a manner transparent to the application server 108 and therefore has no affect on application 119. That is, application 119 and application server 108 remain unaware that the voice server 118 is processing text input via interface 106, as opposed to voice input. The output produced by voice server 118 and sent to Chatbot server 114 can be the same in either case. Further, the output produced by the application server 108 and sent to the Chatbot server 114 can be the same. Thus, multiple communication sessions, one or more being text-based sessions that use interface 106 and others being voice based sessions can be concurrently handled by application server 108. System 110 can be implemented without infrastructure changes to application server 108 (and without changes to voice server 118 assuming interface 106 is present) and without changing code of speech enabled applications 119. This is true, even though the application 119 may lack explicitly coded support for text exchange interactions and would be unable to support such interactions without the disclosed invention. Further, the text exchange interface 110 can be any off-the-shelf text exchange software, which needs not be modified to operate as shown in system 100.

In system 100, the Chatbot server 114 can fetch 121 voice markup 123 associated with a speech enabled application 119, which it executes. The Chatbot server 114 can also relay textual input 120 from interface 110 to send text 122 consumable by voice server 118 via interface 106. The voice server 118 can match the input against a recognition grammar and generate text output 124 for the Chatbot server 114. The Chatbot server 114 can use this output 124 when it executes the application. The application 119 processes this output, which can produce a responsive output, typically in a form of a Voice markup segment, such as VoiceXML (which can further employ the use of the W3C Speech Synthesis Markup Language or SSML). When performing text exchange operations, normal speech synthesis operations performed by the voice server 118 can be bypassed. The Chatbot server 114 can dynamically convert the responsive output from the markup into textual output 126, which interface 110 handles. For example, textual content contained between markup tags can be extracted from the application 119 markup (i.e., the markup tags can be omitted) and included within a text 126 message.

During the communication session, switching engine 115 can perform a switching operation from text-exchange interface 110 to voice interface 112. The switching operation can occur in a fashion transparent to application 119 and can occur without interrupting the communication session. After the switch, voice input 134 can be received from interface 112, which is conveyed to server 118 as voice input 136. Voice output 138 can be generated in response, which is conveyed to voice interface 112 as voice output 140.

From within interface 100, a user can switch from one modality to another, which results in Chatbot server 114 performing a switching operation. This switching can occur in a manner transparent to application 119 and a dialogue state of an existing communication session can be seamlessly maintained.

To illustrate, Chatbot server 114 can switch from the text exchange interface 110 to voice interface 112. The voice interface 112 can be provided through a separate device, such as a phone. After the switch, voice input 134 can be routed as input 136 to Chatbot server 114. The Chatbot server can send the voice input 136 to the voice server 118, which produces text result 138. The Chatbot server can generate new markup after processing result 138, which is sent (not shown) to voice server 118, which returns (not shown) voice output. The voice output can be conveyed to voice interface 112 by Chatbot server 114 as voice output 140.

One feature of the switching engine 115 is an inference module that automatically detects occurrences of conditions of interaction problems. These conditions can be established in step 160 of the illustrated flow chart. In step 162, a value indicative of an interaction problem can be calculated during a communication session. In step 164, the calculated value can be compared against one or more modality switching thresholds. In step 166, when a threshold is exceeded, a modality switching action can be triggered that is associated with the exceeded threshold. In step 168, connection information for the new modality can be determined. A user or a user machine can be queried as necessary. For example, when modality change requires a new telephony connection be established with a phone (associated with voice interface 112) than a telephone number can be required so that Chatbot server 114 can call the phone. This number can be received through user input or can be automatically looked-up from a previously established profile. In step 170, modalities can be switched and previous communication channels can be closed as necessary.

A set of illustrative inferential switching conditions, which are not intended to be exhaustive, is shown in table 180. Different conditions can be indicative of a problem with a text exchange modality and with a speech modality. In table 180, a text exchange modality problem that could be corrected by a switch to a voice modality is indicated by symbol "T→V" included in the value column. Symbol "V→T" is used to indicate a voice modality problem that could be corrected by a switch to a text exchange modality. Different conditions can optionally have a set of severity levels associated with them, where a modality problem is greater for a higher severity level.

In table 180, conditions associated with text exchange problems include inappropriate text entry, excessively long text input, long delays between input, and out of context input. Inappropriate text can be text indicative of angst or user frustration. Textual swearing or other frustration indicative input, such as "$@#@" or "****" are examples of inappropriate text. A detection of excessively long text input can indicate that a voice modality may be better served for input capture. This is especially true when long delays between input is combined with the long text, which can indicate a user is entering text through a cumbersome interface, such as through a mobile phone keypad, or can simply indicate that a user is an inexpert typist. Long delays between input can indicate user confusion regarding a correct manner to respond to a prompt and/or can indicate that a user is having difficulty typing a response. Out of context input can indicate an interaction problem with an automated system, which may be aggravated by the free form nature of a text-exchange modality. A user repetitively providing out of context input may benefit from switching to a more directed interface, such as dialogue-driven and contextually restrained voice interface.

Conditions associated with a speech modality that are shown in table 180 include recognition accuracy problems and problems with a low quality voice channel. Recognition accuracy problems can result from a speaker who speaks in an unclear fashion or has a strong dialect not easily understood by voice server 118. Additionally, many name, street addresses, and other often unique words or phrases are difficult for a voice server 118 to recognize. Additionally, a low quality voice channel between interface 112 and server 118 can be problematic for a voice modality, but less so for a text exchange modality.

In one embodiment, detection of a problem condition can result in a modality switching action being immediately triggered. In another embodiment, a set of weights (or problem points) and thresholds can be established, where modality switching actions only occur after a sufficient quantity of problem points are accrued to reach or exceed one or more action thresholds. Table 185 provides an example of a table that associates different thresholds with different switching actions.

As shown, a switching action can prompt a user to switch modalities or can occur automatically. A switching action can also switch from automated interactions with the voice server 118 to live interactions with agent 116. Additionally, a switching action can either disable an existing communication modality or not depending on circumstances. For example, when a voice server 118 is having difficulty understanding speech input received form interface 112, an additional and simultaneous text exchange channel can be opened so that input/output can be sent/received by either interface 110 and/or 112. When simultaneously operational, interface 110 and 112 can operate upon the same or different devices and within a same (e.g., multi mode interface) or different interface.

Figure 2:
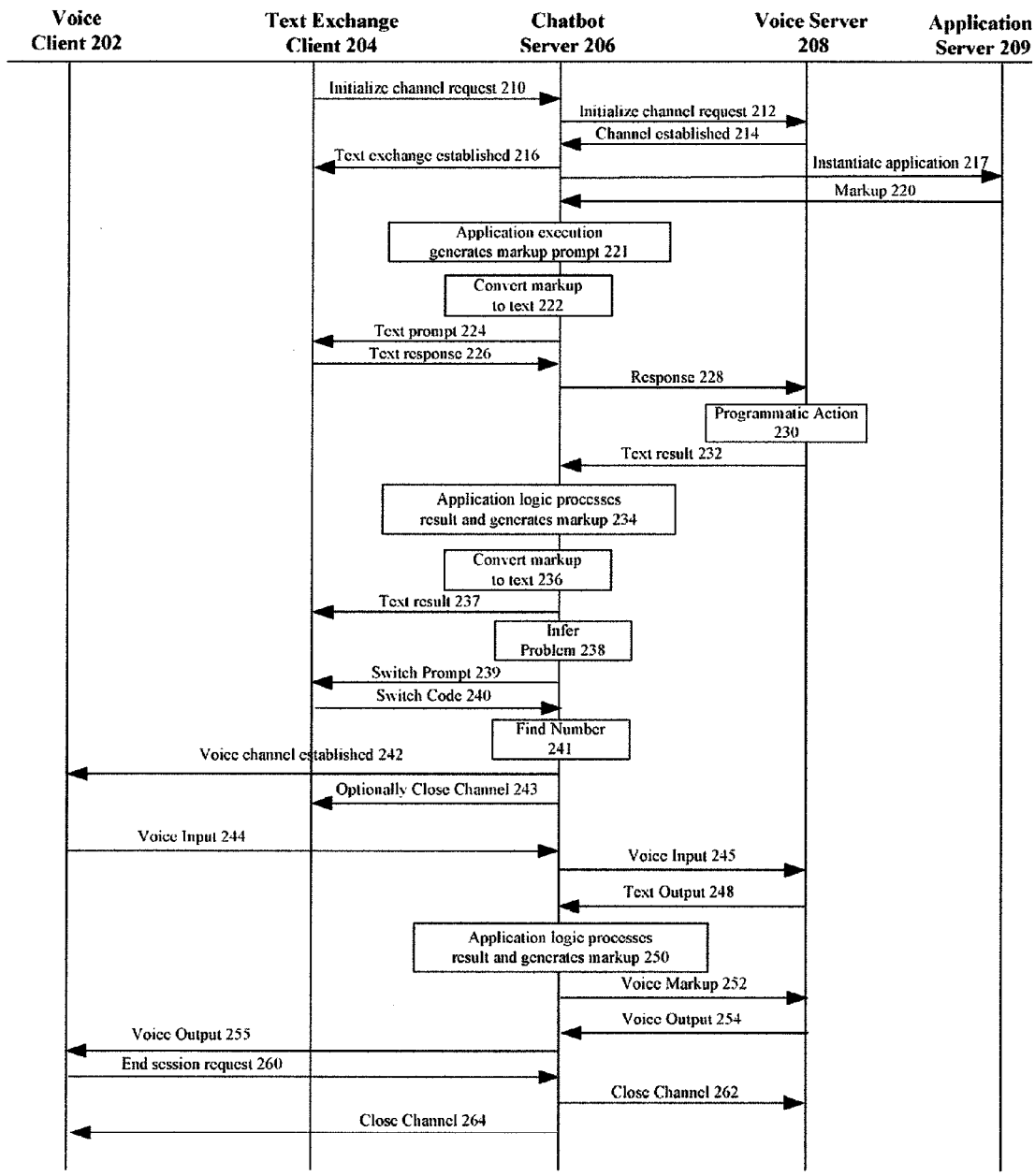
FIG. 2 is a process flow diagram showing inferential modality switching during a communication session involving a voice client, a text exchange client, a voice client, a Chatbot server, and a voice server in accordance with an embodiment of the inventive arrangements disclosed herein.

FIG. 2 is a process flow diagram 200 showing inferential modality switching during a communication session involving a voice client 202, a text exchange client 204, a Chatbot server 206, a voice server 208, and an application server 209 in accordance with an embodiment of the inventive arrangements disclosed herein.

The voice server 208 can include a text input API, which is typically used by developers, system maintainers, and/or trainers of a speech recognition engine. This set of APIs, which are typically not available or accessible within a production environment, can be enabled to permit the voice server 208 to directly consume text, which requires considerably fewer computing resources than those needed to process voice input, which server 208 typically receives.

As shown, client 204 can send a request 210 to Chatbot server 206 to initialize a text modality channel. Chatbot server 206 can send a channel initialization message 212 to voice server 208, to establish a session. Server 208 can positively respond, causing a channel 214 to be established between servers 206 and 208. Chatbot server 206 can then establish the requested text channel 216 with client 204. After step 216, the Chatbot server 206 can send a request 217 to application server 209, which causes a speech enabled application to be instantiated. That is, application markup 220 can be conveyed to Chatbot server 206 for execution.

Application initiated prompt 221 can occur, when the ChatBot Server 206 executes the speech enabled application 119. Server 206 can convert 222 markup provided by application 119 into pure text, represented by text prompt 224, which is sent to client 204. For example, prompt 221 can be written in markup and can include:

<prompt>text context</prompt>.

The converting 222 can extract the text context (omitting the markup tags) and generate a text prompt 224, which only includes the text context. Client 204 can respond 226 to the prompt via the text channel. Server 206 can relay response 228, which can be identical to response 226, to voice server 208. The voice server 208 can match response 228 against a speech grammar via programmatic action 230, which results in text result 232. The voice server 208 can convey text result 232 to the Chatbot server 206. Chatbot server 206 uses this output 232 when it executes the application logic 243 of executing Application 119, which results in markup being generated. The Chatbot server 206 can convert 236 textual content contained within generated markup into a text result 237, which is sent to client 204.

The voice server 208 can include a text input API, which is typically used by developers, system maintainers, and/or trainers of a speech recognition engine. This set of APIs, which are typically not available or accessible within a production environment, can be enabled to permit the voice server 208 to directly consume text, which requires considerably fewer computing resources than those needed to process voice input, which server 208 typically receives.

As shown, client 204 can send a request 210 to Chatbot server 206 to initialize a text modality channel. Chatbot server 206 can send a channel initialization message 212 to server 208, which uses the text input API. Server 208 can positively respond, causing a channel 214 to be established between servers 206 and 208. Chatbot server 206 can then establish the requested text channel 216 with client 204.

A prompt 220 can be sent from server 208 to server 206 over the voice channel. Server 206 can convert 222 markup provided by server 208 into pure text, represented by text prompt 224, which is sent to client 204. For example, prompt 220 can be written in markup and can include:

<prompt>text context</prompt>.

The converting 222 can extract the text context (omitting the markup tags) and generate a text prompt 224, which only includes the text context. Client 204 can respond 226 to the prompt via the text channel. Server 206 can relay response 228, which can be identical to response 226, to server 208. The server 208 can receive the response 228 via the text input API. Server 208 can take one or more programmatic actions 230 based on the response 228. The programmatic actions can produce a voice result 232 that Chatbot server 206 converts 234 textual content contained within markup into a text-only result 236, which is sent to client 204.

Chatbot server 206 can then infer a potential interaction problem 238 that can be alleviated by shifting modalities. For example, long delays between user input and long text input strings can indicate that it would be easier for a user to interact using a voice modality. A modality switching prompt 239 can be conveyed to client 204, which permits a user to either continue using the text exchange modality or to switch to a voice modality. Appreciably, different actions can be taken when a modality problem is detected by the Chatbot server 206. For example, a user can be prompted to switch modalities, a modality switch can automatically be performed, and a switch between the voice server and a human agent can occur along with any related modality switch. Additionally, different problems can cause an actual switch to occur or can cause an additional channel of communication to be opened without closing an existing channel.

Assuming the user opts to switch modalities, a switch code 240 to that effect can be conveyed to the Chatbot server 206. A telephone number for a voice device 202 can be optionally provided to server 206 by the user. The telephone number can also be automatically looked up from a previously stored profile or dialogue session store. Once the Chatbot server 206 finds the number 241, it can call the voice client 202, thereby establishing 242 a voice channel. The original channel with client 204 can then be optionally closed 243. That is, concurrent text and voice input/output from each client 202-204 is permitted for a common communication session.

Voice input 244 can be conveyed from voice client 202 to Chatbot server 206, which relays the voice input 245 to voice server 208. Voice server 208 can speech recognize the input 245 and provide recognition results 248 to the Chatbot server 206. The executing speech enabled application can apply 250 application logic to the results, which generates markup 252, which is conveyed to voice server 208. Voice output 254 can be generated from the markup 252, which is conveyed through Chatbot server 206 to voice client 202 as voice output 255.

Eventually, client 202 can send an end session request 260 to Chatbot server 206, which closes the channel 262 to the voice server 208 as well as the channel 264 to the voice client 202.

Figure 3:
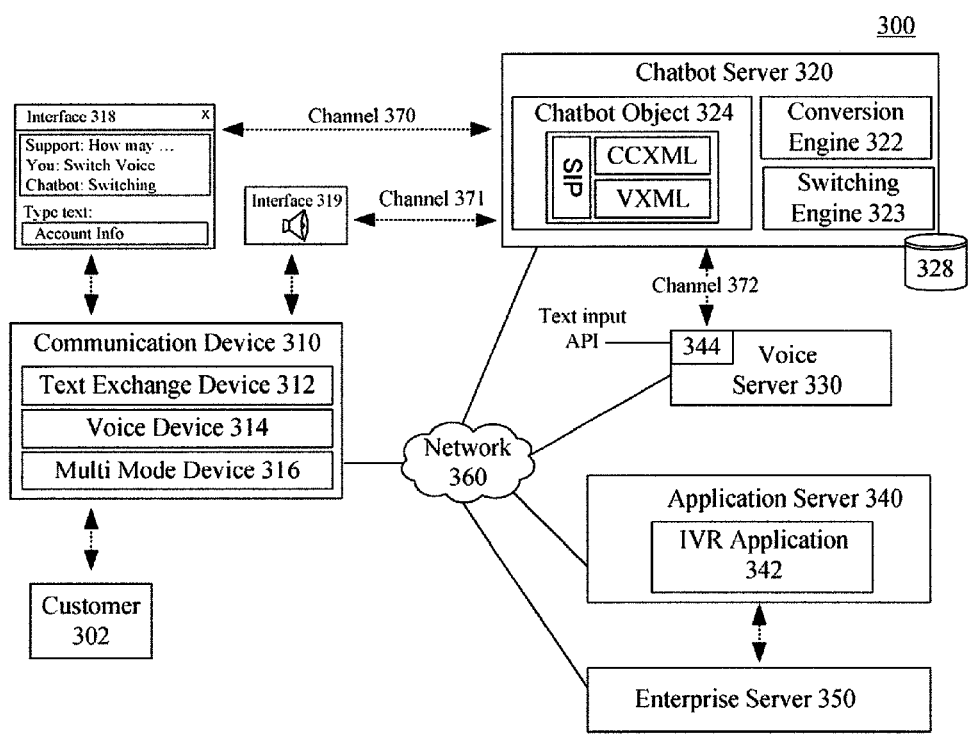
FIG. 3 is a schematic diagram of a system for providing seamless modality switching capabilities and that infers switching conditions in accordance with an embodiment of the inventive arrangements disclosed herein.

FIG. 3 is a schematic diagram of a system for providing seamless modality switching capabilities and that infers switching conditions in accordance with an embodiment of the inventive arrangements disclosed herein. The system of FIG. 3 includes a network 360, which communicatively links communication device 310, Chatbot server 320, voice server 330, application server 340, and enterprise server 350. The network 360 can include any of a variety of components, wired and/or wireless, that together permit digitally encoded information contained within carrier waves to be conveyed from any communicatively linked component to any other communicatively linked component.

The communication device 310 can be any communication device linking a customer 302 to network 360. Devices 310 can include, for example, mobile telephones, line-based phones, computers, notebooks, computing tablets, personal data assistants (PDAs), wearable computing devices, entertainment systems, interactive media devices, and the like. Specific categories of devices 310 include a text exchange device 312, a voice communication device 314, and a multi mode device 316.

A text exchange device 312 is a computing device capable of real-time interactive text exchanges. These text exchanges include online chatting, instant messaging, and text messaging. A communication device 314 can be any device capable of real-time voice communication over network 360. This includes VoIP based communication, traditional circuit switched communications, two-way radio communications, and the like. A multi mode device 316 is a device capable of engaging in text exchanges and in voice communications. Some multi mode devices 316 are restricted to one mode of communication at a time, while others are able to communicate across multiple modes concurrently.

Chatbot server 320 can be a VoiceXML server or equivalent device that dynamically converts text exchange messages from device 310 to messages consumable by voice server 330. Use of a text input API 344, which lets voice server 330 accept text, may permit text from device 310 to be directly consumed by voice server 330. Chatbot server 320 can also dynamically convert output from voice server 330 to output consumable by the speech application, and then making it presentable within interface 318.

For each managed communication session, the Chatbot server 320 can instantiate a Chatbot object 324. The Chatbot object 324 can include a SIP servlet and one or more interpreters, such as a Call Control Extensible Markup Language (CCXML) interpreter, a Voice Extensible Markup Language (VoiceXML) interpreter, an Extensible Hypertext Markup Language (XML) plus voice profiles (X+V) interpreter, a Speech Application Language Tags (SALT) interpreter, a Media Resource Control Protocol (MCRP) interpreter, a customized markup interpreter, and the like. The SIP servlet can map incoming SIP requests to appropriate interpreters.

A switching engine 323 of server 320 can allow a customer 302 to switch modalities in a manner transparent to an executing speech application. For example, the customer 302 can switch from a text exchange interface 318 to a voice interface 319 during a communication session. This switching can cause a text exchange channel 370 to close and a voice channel 371 to be established. The Chatbot server 320 can trigger text input API 344 to be utilized or not depending on a type of input that is conveyed over channel 372. In one embodiment, a data store 328 can include information that facilitates switching, such as storing telephone numbers associated with voice device 314 associated with voice interface 318.

The conversion engine 322 of server 320 can perform any necessary conversions to adapt output from text exchange device 312 to input consumable by voice server 330. Typically, no significant conversions are necessary for text consumed by the voice server 330, which provides access to text mode interaction functions via API 344. Appreciably, text mode interaction functions are typically used by developers during a testing and development stage, but are being used here at runtime to permit the voice server 330 to directly handle text. For example, the Internet Engineering Task Force (IETF) standard Media Resource Control Protocol version 2 (MRCPv2) contains a text mode interpretation function called INTERPRET for the Speech Recognizer Resource, which would permit the voice server 330 to directly handle text.

The application server 340 will typically generate voice markup output, such as VoiceXML output, which a voice server 330 converts to audio output. The conversion engine 322 can extract text content from the voice markup and can convey the extracted text to communication device 310 over channel 370.

Application server 340 can be an application server that utilizes modular components of a standardized runtime platform. The application server 340 can represent a middleware server of a multi-tier environment. The runtime platform can provide functionality for developing distributed, multi-tier, Web-based applications. The runtime platform can also include a standard set of services, application programming interfaces, and protocols. That is, the runtime platform can permit a developer to create an enterprise application that is extensible and portable between multiple platforms. The runtime platform can include a collection of related technology specifications that describe required application program interfaces (APIs) and policies for compliance.

In one embodiment, the runtime platform can be a JAVA 2 PLATFORM ENTERPRISE EDITION (J2EE) software platform. Accordingly, the application server 340 can be a J2EE compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the .NET software platform, are contemplated herein.

The IVR application 342 can be an application that permits callers to interact and receive information from a database of an enterprise server 350. Access to the voiceXML server 320 (which has been extended for Chatbot 320) can accept user input using touch-tone signals, voice input, and text input. The IVR application 342 can provide information to the user in the form of a single VoiceXML application that can be used by any modality, including DTMF, voice, and chat. The voice markup can also be directly conveyed to conversion engine 322, where it is converted to text presentable in interface 318.

The IVR application 342 can present a series of prompts to a user and can receive and process prompt responses in accordance with previously established dialogue menus. Speech processing operations, such as text-to-speech operations, speech-to-text operations, caller identification operations, and voice authorization operations can be provided by a remotely located voice server 330. Without the intervention of Chatbot server 320, IVR application 342 would be unable to interact with a text exchange device 312, since it lacks native coding for handling text exchange input/output.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for allowing multimodal communication with a first device executing a speech-enabled application during a communication session with a user, comprising:
   with the first device, at a first time during the communication session, receiving a first signal from a voice server via a communication channel, the first signal corresponding to speech recognition results generated by the voice server of a voice input originating from a voice interface operated by the user during the communication session;
   with the first device, processing the first signal with the speech-enabled application during the communication session with the user to generate a first responsive output;
   with the first device, at a second time during the communication session with the user, receiving a second signal from the voice server via the communication channel, the second signal corresponding to a text input originating from a text interface operated by the user during the communication session, the voice server having received the text input via a communications network; and
   with the first device, processing the second signal with the speech-enabled application during the communication session with the user to generate a second responsive output, and communicating a third signal corresponding to the second responsive output to the text interface via a communication path exclusive of the voice server.

2. The method of claim 1, wherein voice interface and the text interface are elements of a mobile communications device.

3. The method of claim 1, wherein the first device comprises an automated response system.

4. The method of claim 1, wherein:
   the voice server is capable of communicating with each of the voice interface and the text interface, and the method further comprises:
   with the first device, receiving each of the first signal and the second signal from the voice server via the communication channel.

5. The method of claim 4, wherein voice interface and the text interface are elements of a mobile communications device.

6. The method of claim 1, wherein:
   processing the first signal with the speech-enabled application comprises producing the first responsive output in the form of a voice markup segment; and
   processing the second signal with the speech-enabled application comprises producing the second responsive output in the form of a voice markup segment.

7. A system in which a user is able to engage in multiple modes of communication with a speech-enabled application, comprising:
   a first device configured to execute the speech-enabled application so as to engage in a communication session with a user;
   a voice interface operable by the user during the communication session; and
   a text interface operable by the user during the communication session;
   wherein the system is configured such that the first device is able to receive, at a first time during the communication session, a first signal from a voice server via a communication channel, the first signal corresponding to speech recognition results generated by the voice server of a voice input originating from the voice interface, and to process the first signal with the speech-enabled application during the communication session with the user to generate a first responsive output; and
   wherein the system is further configured such that the first device is able to receive, at a second time during the communication session with the user, a second signal from the voice server via the communication channel, the second signal corresponding to a text input originating from the text interface operated by the user during the communication session, to process the second signal with the speech-enabled application during the communication session with the user to generate a second responsive output, and to communicate a third signal corresponding to the second responsive output to the text interface via a communication path exclusive of the voice server; and
   wherein the system is further configured such that the voice server is able to receive the text input via a communications network.

8. The system of claim 7, wherein voice interface and the text interface are elements of a mobile communications device.

9. The system of claim 7, wherein the first device comprises an automated response system.

10. The system of claim 7, wherein the voice server is capable of communicating with each of the voice interface and the text interface, and wherein the communications channel is established between the first device and the voice server.

11. The system of claim 10, wherein the voice interface and the text interface are elements of a mobile communications device.

12. The system of claim 7, wherein the speech-enabled application is adapted to process the first signal so as to produce the first responsive output in the form of a voice markup segment, and to process the second signal so as to produce the second responsive output in the form of a voice markup segment.

13. A system for allowing multimodal communication during a communication session with a user, comprising:
   a device configured to execute a speech-enabled application; and
   a voice server comprising first means for, at a first time during the communication session, communicating a first signal corresponding to speech recognition results generated by the voice server of a voice input from a voice interface to an input of the device executing the speech-enabled application for processing thereby to generate a first responsive output, and second means for, at a second time during the communication session, receiving text input from a text interface via a communications network and communicating a second signal corresponding to the text input to the input of the device executing the speech-enabled application for processing thereby to generate a second responsive output;
   wherein the device configured to execute the speech-enabled application is further configured to communicate a third signal corresponding to the second responsive output to the text interface via a communication path exclusive of the voice server.

14. The system of claim 12, further comprising the voice interface and the text interface, and wherein the voice interface and text interface are elements of a mobile communications device.

15. The system of claim 14, wherein the device configured to execute the speech-enabled application comprises an automated response system.

16. The system of claim 13, wherein the device configured to execute the speech-enabled application comprises an automated response system.

17. The system of claim 13, wherein the speech-enabled application is adapted to process the first signal so as to produce the first responsive output in the form of a voice markup segment, and to process the second signal so as to produce the second responsive output in the form of a voice markup segment.

* * * * *